April 16, 1963  T. M. EVANS ET AL  3,085,680
FILTER PAPER PACKAGE AND METHOD OF PACKAGING FILTER PAPER
Filed Sept. 23, 1958  2 Sheets-Sheet 1

Inventors,
Thomas M. Evans,
Noland W. Brown,
by Gilbert P. Tarleton
Their Attorney.

April 16, 1963 T. M. EVANS ET AL 3,085,680
FILTER PAPER PACKAGE AND METHOD OF PACKAGING FILTER PAPER
Filed Sept. 23, 1958 2 Sheets-Sheet 2

Inventors,
Thomas M. Evans,
Noland W. Brown,
by Gilbert P. Tarlton
Their Attorney.

United States Patent Office 3,085,680
Patented Apr. 16, 1963

3,085,680
FILTER PAPER PACKAGE AND METHOD OF PACKAGING FILTER PAPER
Thomas M. Evans and Noland W. Brown, Pittsfield, Mass., assignors to General Electric Company, a corporation of New York
Filed Sept. 23, 1958, Ser. No. 762,724
4 Claims. (Cl. 206—46)

This invention relates to a package of filter paper of the type which is used to filter transformer oil or other electrical insulating liquids for electrical apparatus, and also to a method of packaging such filter paper.

For the most effective insulating and cooling of an electrical apparatus, such as a transformer, which is immersed in oil or other electrical insulating liquid, the liquid must be clean and dry. By clean and dry is meant that the liquid is free from dirt and moisture and similar foreign matter. The usual way to insure that the liquid is clean and dry is to pass it through a filter press which consists of a pump which forces the liquid through filter paper clamped in a frame.

To be most effective the filter paper must be clean and dry. At present the paper is received from the paper mills in convenient packages similar to those used for writing paper. No particular effort is made to keep the paper dry inasmuch as it is dried in an oven just prior to being placed in the filter press. Drying requires the service of an attendant and takes several hours.

In one form of our invention the filter paper is thoroughly dried and then immediately soaked in a clean and dry electrical insulating liquid and then packaged in a hermetically sealed container. By doing this the filter press operator avoids drying the paper before using it and needs to use only about half as much paper as in the prior art to filter the same amount of electrical insulating liquid. This is because he initially starts out with a filter paper which for practical purposes is moisture-free.

While the specification concludes with claims particularly pointing out and distinctly claiming the subject matter which we regard as our invention, it is believed the invention will be better understood from the following description taken in connection with the accompanying drawing in which:

Figures 1, 2:
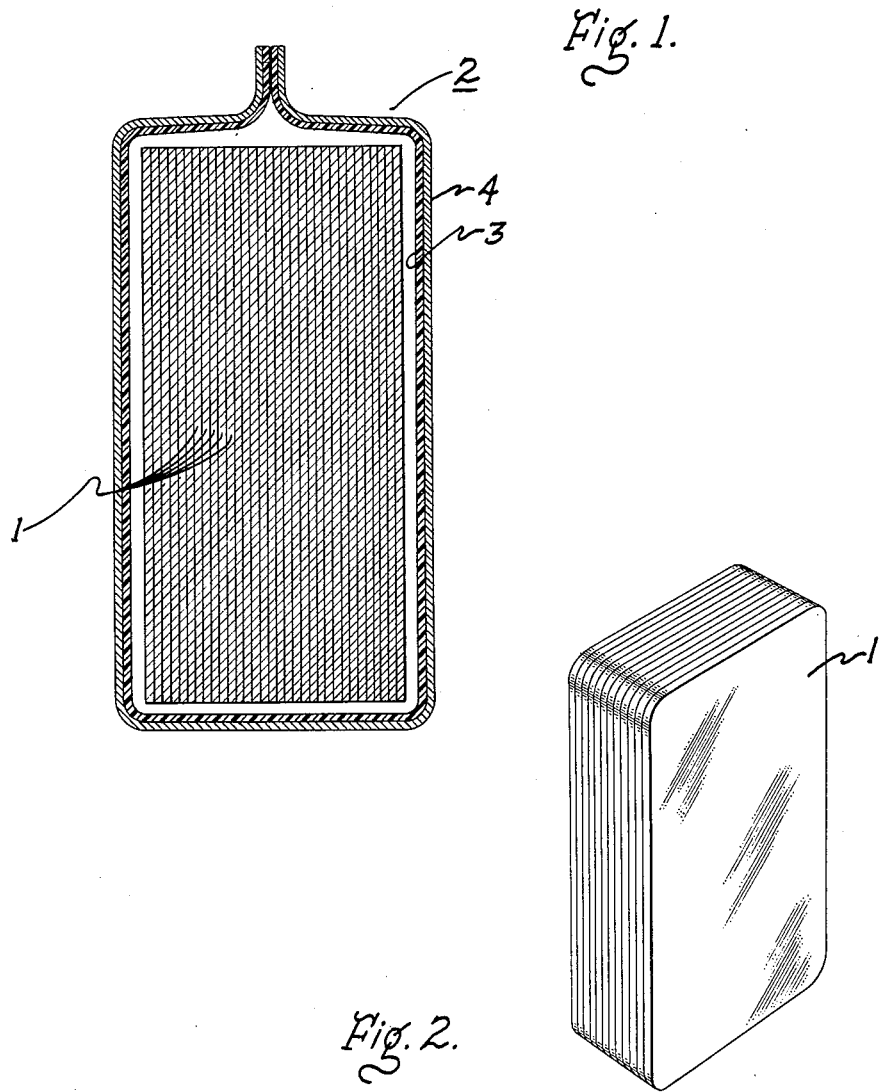
FIG. 1 is a sectional view of one form of our invention.
FIG. 2 is a view in perspective of the sheets of filter paper in FIG. 1.

Referring now particularly to FIG. 1, illustrated therein is a package of filter paper 1 which is in flat sheet form and is hermetically sealed in a container 2. The container 2 comprises a flexible, metallized, plastic bag. That is, it has a polyethylene or other plastic material inside coating 3 and a metallized exterior 4. The metallized exterior 4 may comprise aluminum foil. The upper end of the bag 2 is open and it may be hermetically sealed closed by heat and pressure. When heat and pressure are applied to the edges of the open end of the bag opposite surfaces of the polyethylene or other plastic coating 3 will be hermetically sealed to each other. However, the invention is not restricted to this particular sealing means since other sealing means, as for instance pressure closure clips, could be used.

The invention is not restricted to the particular type of container shown nor to the particular configuration of the filter paper. For instance, the filter paper could be packaged in a metal can or other hermetically sealed container. However, a container which is lightweight and low in cost is preferred. A lightweight container is preferred so as to reduce shipping costs. A low cost container is preferred inasmuch as then it can be disposable. It will be appreciated that a non-disposable container will incur additional shipping charges in returning the same to the filter paper manufacturer.

The bag 2 or a similar container is preferred inasmuch as it is lightweight and can be low in cost. When a bag such as that in FIG. 1 is utilized the corners of the flat sheets of filter paper are rounded off as in FIG. 2 inasmuch as filter paper having sharp corners might puncture the bag.

One form of method which can be used in practicing our invention is to first dry dirt-free paper in an oven and preferably under vacuum pressure so as to quickly drive off all its moisture. Then the vacuum-dried paper is immediately impregnated with an electrical insulating liquid before it can have any opportunity to pick up moisture from the atmosphere. This can be accomplished by immediately removing the paper from the drying oven and transferring it to a tank of electrical insulating liquid. After the paper has been sufficiently soaked in the electrical insulating liquid it will be saturated with the same. Then the saturated paper is transferred to a bag such as that illustrated in FIG. 1 which is then hermetically sealed closed. The vacuum-dried paper could be first transferred to the bag 2 and then filled with the electrical insulating liquid. However, a liquid filled bag is not preferred inasmuch as this increases the shipping weight of the container. Additionally, it is believed that first soaking the filter paper and then transferring it to the empty container will afford less opportunity for the paper to pick up moisture than when the dry paper is transferred to the container which then is filled with liquid. Also, a container which is empty except for impregnated filter paper poses less of a leakage problem than a liquid filled container. After the paper is transferred to the bag and before it is sealed closed preferably as much of the liquid is squeezed out as possible so as to have reduced shipping weight and therefore reduced shipping cost.

Figure 3:
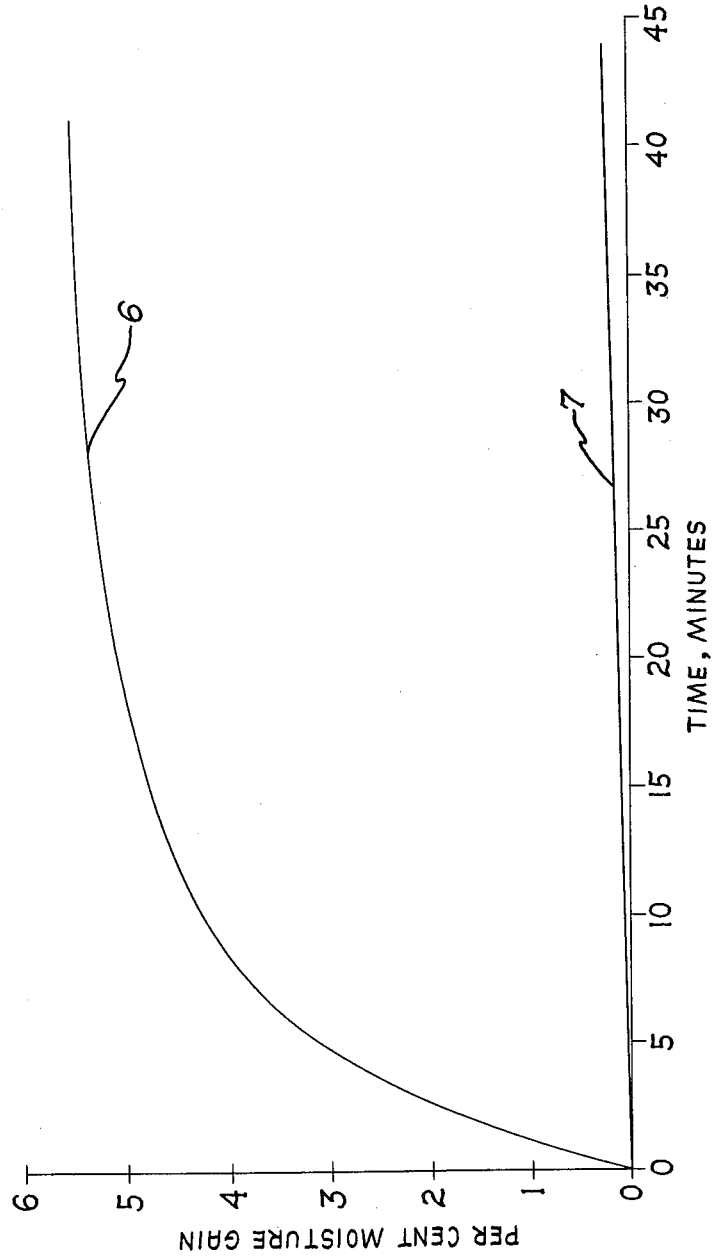
FIG. 3 is a graphic illustration of the improved state of filter paper which is packaged in accordance with our invention over that of the prior art practice.

Referring now to FIG. 3, shown therein is a graph to illustrate the magnitude of improvement obtainable with our invention over the prior art. The left-hand vertical scale is the percent moisture gain scale, and the horizontal scale is the time scale in minutes. Curve 6 illustrates the percent moisture gain vs. time for filter paper packaged in accordance with the prior art. It will be noticed that at saturation the filter paper picks up about 5½% moisture. It can be assumed that it takes about five minutes for an operator to transfer filter paper from a drying oven to a filter press. In five minutes the filter paper will absorb about 3% moisture in an atmosphere of 50% relative humidity. This is more than one-half of the total moisture it is capable of picking up. Therefore, in the prior art the filter paper is only about one-half as effective as it could be under perfectly dry conditions. Curve 7 of FIG. 3 illustrates the percent moisture gain vs. time for filter paper packaged in accordance with our invention. Curve 7 shows that if dried and oil-soaked filter paper is left to stand in the same atmosphere for the same period it will pick up about 0.005% moisture which is negligible. In fact, the slope of curve 7 illustrates that filter paper packaged in accordance with our invention could be left to stand in the atmosphere for several hours without materially reducing its total moisture absorption capacity. This means that in our invention about half as much paper and time will be required to filter the same amount of electrical insulating liquid as would be required with filter paper packaged as in the prior art. This is because in our invention at the time the package is broken open for transferring the paper to the filter press it is almost perfectly dry and clean. That is to say, it is free of moisture and dirt and other similar contaminants. Of course, when the oven dried paper is impregnated or soaked with an electrical insulating liquid the liquid should be moisture and dirt-free to realize the maximum moisture and dirt absorption capacity of the paper. If the dried paper is impregnated or soaked to saturation with the liquid right after drying then there is very little opportunity for the paper to pick up any moisture from the atmosphere while it is being transferred from its hermetically sealed package to the filter press.

Conventional filter presses for filtering transformer oil or other electrical insulating liquids for electrical apparatus use about 120 sheets of paper in the press. The filter press has not been illustrated inasmuch as it constitutes no part of the invention and is a well known structure. However, it will be obvious that our invention makes it possible to filter electrical insulating liquids much more economically than in the prior art practice. In practicing the invention it will be obvious to those skilled in the art that the liquid which is used to impregnate or soak the dried filter paper should be compatible with the liquid which the filter paper is going to be used to filter. That is to say, the vacuum-dried paper should not be impregnated or saturated with a liquid which is going to contaminate or have an adverse effect on the liquid which is going to be filtered.

While the invention has been described with respect to filtering the insulating liquid of transformers it will be obvious that our invention is not restricted to such use. For instance, the invention is useful in filtering the insulating liquids of other electrical apparatus such as induction and step regulators, reactors, and the like.

While there has been shown and described a particular embodiment of the invention, it will be obvious to those skilled in the art that changes and modifications may be made without departing from the invention, and therefore, it is intended by the appended claims to cover all such changes and modifications as fall within the true spirit and scope of the invention.

What we claim as new and desire to secure by Letters Patent of the United States is:

1. A method of packaging filter press paper which has a rapid rate of moisture absorption and which is to be used in a filter paper press to filter moisture and dirt from an electrical insulating liquid, said method comprising drying said paper under vacuum pressure to drive off its moisture, then dipping said vacuum-dried paper in some moisture and dirt-free electrical insulating liquid of the type used to insulate and cool electrical apparatus to saturate said vacuum-dried paper with clean and dry electrical insulating liquid, and then hermetically sealing said saturated paper in a disposable container.

2. A package of filter paper which has a rapid rate of moisture absorption and which is to be used to filter moisture and dirt from an electrical insulating liquid, said package comprising a hermetically sealed container which has dried and clean electrical insulating liquid impregnated filter paper therein, said liquid saturating said paper and being of the type used to insulate and cool electrical apparatus.

3. A package of filter paper which has a rapid rate of moisture absorption and which is to be used to filter moisture and dirt from an electrical insulating liquid, said package comprising a lightweight and disposable metallized polyethylene hermetically sealed empty container which has vacuum-dried and clean electrical insulating liquid saturated filter paper therein, said liquid being of the type used to insulate and cool electrical apparatus, said paper being in flat sheet form and having rounded corners.

4. A method of packaging filter paper which has a rapid rate of moisture absorption and which is to be used to filter moisture and dirt from an electrical insulating liquid of the type used to insulate and cool electrical apparatus, said method comprising drying said paper under vacuum pressure to drive off its moisture, impregnating said paper with a moisture and dirt free electrical insulating liquid of the type which the paper is going to be used to filter, placing said impregnated filter paper in an hermetically sealable container, squeezing said container containing said impregnated paper to remove any excess liquid therefrom, and hermetically sealing said container.

References Cited in the file of this patent

UNITED STATES PATENTS

| | | |
|---|---|---|
| 1,621,725 | Hills | Mar. 22, 1927 |
| 1,885,133 | Oppenheimer | Nov. 1, 1932 |
| 2,058,846 | Waterman | Oct. 27, 1936 |
| 2,125,413 | Arnold | Aug. 2, 1938 |
| 2,400,390 | Clunan | May 14, 1946 |
| 2,576,864 | Valente | Nov. 27, 1951 |
| 2,600,845 | Carrigan | June 17, 1952 |
| 2,635,742 | Swartz et al. | Apr. 21, 1953 |

FOREIGN PATENTS

| | | |
|---|---|---|
| 158,356 | Australia | Aug. 20, 1954 |